US009982625B2

United States Patent
Acocella et al.

(10) Patent No.: US 9,982,625 B2
(45) Date of Patent: May 29, 2018

(54) ACTIVE INSULATION BURNER, PARTICULARLY FOR AN EXTERNAL COMBUSTION ENGINE

(71) Applicant: Worgas Bruciatori S.r.l., Formigine, Modena (IT)

(72) Inventors: Antonio Acocella, Formigine (IT); Gabriele Gangale, Formigine (IT); Giulio Cenci, Formigine (IT)

(73) Assignee: Worgas Bruciatori S.r.l., Formigine (IT)

( * ) Notice: Subject to any disclaimer, the term of this patent is extended or adjusted under 35 U.S.C. 154(b) by 125 days.

(21) Appl. No.: 14/917,524

(22) PCT Filed: Sep. 9, 2014

(86) PCT No.: PCT/IB2014/064336
§ 371 (c)(1),
(2) Date: Mar. 8, 2016

(87) PCT Pub. No.: WO2015/033324
PCT Pub. Date: Mar. 12, 2015

(65) Prior Publication Data
US 2016/0215726 A1    Jul. 28, 2016

(30) Foreign Application Priority Data
Sep. 9, 2013   (IT) ............................. MI2013A1480

(51) Int. Cl.
*F02G 1/055*       (2006.01)
*F23D 99/00*       (2010.01)
(Continued)

(52) U.S. Cl.
CPC ............. *F02G 1/055* (2013.01); *F23D 14/02* (2013.01); *F23D 14/58* (2013.01); *F23D 91/02* (2015.07);
(Continued)

(58) Field of Classification Search
CPC ...... F02G 1/055; F02G 2254/10; F23D 14/02; F23D 14/58; F23D 91/02; F23D 2203/1012; F23D 2203/102
(Continued)

(56) References Cited

U.S. PATENT DOCUMENTS 4,984,428 A * 1/1991 Momose ................. F02G 1/043
60/517
5,301,506 A * 4/1994 Pettingill ............... F02G 1/0445
60/520
(Continued)

FOREIGN PATENT DOCUMENTS

DE         38 44 554 A1      9/1989
WO    WO 2008/084228 A1     7/2008
(Continued)

*Primary Examiner* — Hoang Nguyen
(74) *Attorney, Agent, or Firm* — Blank Rome LLP (57) ABSTRACT

A burner (1) comprises a front wall (2) with an exchanger opening (4) for the passage of a heat exchanger (14), a rear wall (5) with a fume discharge opening (7), a tubular side wall (8), a tubular diffuser wall (9) within the side wall (8), an annular distribution chamber (12) formed between the side wall (8), a combustion chamber (13) formed within the diffuser wall (9) and suitable for the insertion of the heat exchanger (14), wherein the rear wall (5) comprises a cooling interspace in flow communication with the gas supply line of the burner.

13 Claims, 8 Drawing Sheets

(51) Int. Cl.
*F23D 14/58* (2006.01)
*F23D 14/02* (2006.01)

(52) U.S. Cl.
CPC .... *F02G 2254/10* (2013.01); *F23D 2203/102* (2013.01); *F23D 2203/1012* (2013.01)

(58) Field of Classification Search
USPC .................................................. 60/517–526
See application file for complete search history.

(56) References Cited

U.S. PATENT DOCUMENTS

| | | | |
|---|---|---|---|
| 5,918,463 A | 7/1999 | Penswick et al. | |
| 6,952,921 B2* | 10/2005 | Qiu ........................ | F02G 1/055 60/517 |
| 8,015,808 B2* | 9/2011 | Keefer .................... | F02B 43/10 60/517 |
| 8,387,380 B2* | 3/2013 | Roychoudhury ....... | F02G 1/043 60/517 |
| 2006/0179835 A1* | 8/2006 | Qiu ........................ | F28D 17/02 60/521 |

FOREIGN PATENT DOCUMENTS

| | | |
|---|---|---|
| WO | WO 2009/112909 A2 | 9/2009 |
| WO | WO 2011/157662 A1 | 12/2011 |

\* cited by examiner

FIG. 10

ACTIVE INSULATION BURNER, PARTICULARLY FOR AN EXTERNAL COMBUSTION ENGINE

The present invention relates to a gas burner for an external combustion engine, particularly for a Stirling engine or a Rankine cycle engine.

As it is known, the Stirling engines implement the so-called Stirling cycle for converting thermal energy (particularly, a thermal gradient) into work (particularly, into a cyclic kinematic movement), or vice versa by a closed loop, using a gas as the thermodynamic fluid, usually air or nitrogen, or helium or hydrogen in their high-performance versions. When a suitable temperature difference is reached between a hot spot and a cold spot of the Stirling cycle, a cyclical pulse is triggered, which is typically converted into a reciprocating motion of the pistons. The pulsation lasts as long as the temperature difference is maintained, providing heat to the hot spot and subtracting it to the cold one.

As an alternative to the Stirling engines, the Rankine engines implement the so-called Rankine cycle for converting thermal energy into work (particularly, into a cyclic kinematic movement) by an endoreversible thermodynamic cycle consists of two adiabatic changes and two isobaric changes.

The burners used as a heat source for the external combustion engines must provide the heat amount required by the thermodynamic cycle, have such a size and shape as to promote an efficient and rapid heat exchange between the combustion gases and the thermodynamic fluid, adapt to the engine space conditions, prevent an undesired overheating of components of the engine itself, withstand high temperatures and possible "heat build-ups", withstand mechanical stress due to thermal expansions and mechanical stresses, e.g., vibrations, due to the cyclical movement of the pistons of the external combustion engine.

The prior art burners, although being satisfactory with reference to some specific needs, are not able to reconcile in an optimal manner the set of all the requirements listed above, particularly with reference to the thermal and/or mechanical stresses and a fast and efficient thermal exchange.

Therefore, the object of the present invention is to provide a gas burner for an external combustion engine having such characteristics as to better reconcile the needs listed above.

A particular object of the invention is to provide a gas burner having such characteristics as to improve the thermal exchange rate and efficiency and to protect the components of the burner and of the external combustion engine from damages due to overheating and excessive thermal expansions.

These and other objects are achieved by a burner according to claim 1. The dependent claims relate to advantageous embodiments.

In accordance with an aspect of the invention, the burner comprises:
- a front wall defining a front side of the burner and forming a exchanger passage opening,
- a rear wall defining a rear side of the burner and forming a fume discharge passage,
- a tubular side wall extending between the front wall and the rear wall,
- a tubular diffuser wall arranged inside the side wall and extending between the front wall and the rear wall, said diffuser wall having a perforation for the passage of a gas mixture from an outer side of the diffuser wall to an inner side of the diffuser wall, where the combustion occurs,
- an annular distribution chamber formed between the side wall and the diffuser wall for the distribution of the gas mixture on the outer side of the diffuser wall,
- a combustion chamber formed within the diffuser wall, said combustion chamber being defined on the rear side by the rear wall and suitable for the insertion of a heat exchanger from the front side through the exchanger passage opening of the front wall,
- a cooling interspace formed within the rear wall and in flow communication with a gas inlet opening and with the distribution chamber so that the gas mixture cools the rear wall.

In accordance with an aspect of the invention, the rear wall comprises:
- an outer layer (outer metal sheet) having an outer peripheral edge connected with a rear edge of the side wall, and
- an inner layer (inner metal sheet) arranged between the outer layer and the combustion chamber and having an outer peripheral edge connected with a rear edge of the diffuser wall, in which the cooling interspace is formed between the outer and inner layers, and it forms, together with the annular distribution chamber, a cup-shaped distribution cavity.

By virtue of the configuration of the distribution and combustion chambers and the presence of the cooling interspace in the rear wall, the combustion can occur all around the heat exchanger. Furthermore, undesired thermal losses and overheating of the bottom wall and the diffuser wall are prevented by virtue of the fact that the flow of gas mixture absorbs the heat in these regions and brings it back to the combustion chamber.

This ensures a quick and efficient thermal exchange with reduced heat losses and protects the rear wall and the adjacent components from overheating.

In order to better understand the invention and appreciate the advantages thereof, some illustrative, non-limiting embodiments will be described herein below, with reference to the figures, in which.

With reference to the figures, a gas burner usable for external combustion engines, particularly for Stirling engines, which produces heat by the combustion generally of a fuel gas or, particularly, of a fuel gas-air mixture, is generally indicated by the reference 1.

The burner 1 comprises a front wall 2 defining a front side 3 of the burner 1 and forming an exchanger passage opening 4, a rear wall 5 defining a rear side 6 of the burner 1 and forming an opening 7 for discharging the combustion fumes, as well as a tubular side wall 8 extending between the front wall 2 and the rear wall 5.

The burner 1 further comprises a tubular diffuser wall 9 arranged inside the side wall 8 and extending between the front wall 2 and the rear wall 5. The diffuser wall 9 has a perforation for the passage of a gas mixture from an outer side 10 of the diffuser wall 9 to an inner side 11 of the diffuser wall 9, where the combustion occurs.

Between the side wall 8 and the diffuser wall 9, an annular distribution chamber 12 is formed for the distribution of the gas mixture on the outer side 10 of the diffuser wall 9. Inside the diffuser wall 9, a combustion chamber 13 is formed, which is defined on the rear side by the rear wall 5 and suitable for the insertion of a first heat exchanger 14 from the front side 3 through the exchanger passage opening 4 of the front wall 2.

In accordance with an aspect of the invention, a cooling interspace 16 is formed in the rear wall 5, which is in flow communication with a gas inlet opening 23 and with the distribution chamber 12, so that the flow of the gas mixture is able to cool the diffuser wall 9 and also the rear wall 5.

In an embodiment illustrated in the figures, the rear wall 5 comprises an outer layer 15 (outer metal sheet) having an outer peripheral edge 17 connected with a rear edge 18 of the side wall 8, and an inner layer 20 (inner metal sheet) spaced apart from the outer layer 15 and arranged between the outer layer 15 and the combustion chamber 13 and having an outer peripheral edge 19 connected with a rear edge 21 of the diffuser wall 9. The cooling interspace 16 is formed between the outer 15 and inner 20 layers, and it forms, together with the annular distribution chamber 12, a cup-shaped distribution cavity.

By virtue of the configuration of the distribution 12 and combustion 13 chambers, and the presence of the cooling interspace 16 in the rear wall 5, the combustion can occur about the entire heat exchanger 14. Furthermore, undesired thermal losses and overheating of the bottom wall and the diffuser wall are prevented by virtue of the fact that the flow of gas mixture absorbs the heat in these regions and brings it back to the combustion chamber.

This ensures a quick and efficient thermal exchange with reduced heat losses and protects the rear wall and the adjacent components from overheating.

In accordance with an embodiment, the cooling interspace 16 is in the shape of an annular disc, the outer perimeter thereof is in a discrete communication or, preferably, in a continuous, uninterrupted communication along the entire perimeter, with a rear zone of the annular distribution chamber 12.

Advantageously, the gas inlet opening 23 opens into the cooling interspace 16 externally to the annular distribution chamber 12, so that the flow of gas enters first in the cooling interspace 16 and then in the annular distribution chamber 12. In accordance with an embodiment, the gas inlet opening 23 is formed in the side wall 8 in a zone between the outer layer 15 and the inner layer 20 of the rear wall 5.

In accordance with an embodiment, the outer layer 15 and, preferably, also the inner layer 20, are formed in a metal sheet, particularly in steel, and are in the shape of a substantially planar or, alternatively, convex circular disc, the outer peripheral edges 17, 19 thereof can be bent in the direction of the rear side 6 (or the front side 3) in order to define a seat for the insertion of the rear edges 18, 21 of the side 8 and diffusion 9 walls with certainty of a mutual positioning.

A discharge tube 25 forming a fume discharge duct extending through the fume discharge opening 7 of the rear wall 5 is located at central openings 22, 24 of the outer layer 15 and the inner layer 20, for example, inserted and optionally welded. The cooling interspace 16 extends in an annular shape about the discharging tube 25.

The side wall 8 and the diffuser wall 9 are preferably cylindrical and possibly coaxial. The side wall 9 is advantageously made of steel and it forms the mixture inlet opening 23 connectable to a duct for supplying the fuel gas mixture (not illustrated in the figures).

As it is known, and therefore not illustrated in the figures, the perforated zones do not necessarily have a perfectly uniform pattern, or, in other words, distribution and shape. The individual holes can have different shapes and comprise, for example circular holes, longitudinally oriented slots or oblong holes, circumferentially oriented slots or oblong holes, and the distance thereof may vary. Particularly, the individual holes can be grouped in perforation units that are mutually spaced apart from one another by thin wall strips.

In accordance with an embodiment, the diffuser wall 9 comprises a steel sheet in which, in the impermeable zone(s) 26, 27, the single-layer sheet is free from through holes.

In addition, or alternatively, the perforated steel sheet of the diffuser wall 9 is internally lined by a mesh or fabric layer 28 in a metal material, e.g., a FeCr alloy, or a ceramic or sintered material that forms the inner surface 11 of the diffuser wall 9 on which the combustion occurs, and furthermore it performs an insulating function, which further increases the thermal resistance of the burner 1.

In accordance with an embodiment, the side wall 8 and the diffuser wall 9 can be connected to the front 2 and rear 5 walls by pressfit and/or welding.

The front wall 2 is preferably made of steel and it can be in the shape of an annular, preferably circular disc, with an outer edge that can be used for the connection of the burner 1 to the Stirling engine, an intermediate portion to which the side wall 8 and the diffuser wall 9 can be connected, and an inner edge defining the above-mentioned opening 4 for the passage of the first heat exchanger 14.

In accordance with a further embodiment, a surface of the inner layer 20 facing the combustion chamber 13 and, possibly, also an inner surface of the fume discharge passage 7 (i.e., of the discharging tube 25) can be coated by a thermal-resistant mesh or fabric that is identical or similar to the mesh or fabric 28, in order to provide a further mechanical protection and thermal barrier.

In fact, the first heat exchanger 14 is preferably located in the immediate proximity or in direct contact with the inner layer 20 in order to avoid any "leakages" of usable heat toward the fume discharge 7. However, this may involve the risk of a mechanical damage due to vibrations of the heat exchanger 14, which is subjected to the pulses of the thermodynamic fluid and the mechanic vibrations of the Stirling engine.

In accordance with a further embodiment, also the metal sheet of the outer layer 15 is coated by a thermal-resistant mesh or fabric, which is identical or similar to the mesh or fabric 28, in order to provide a further thermal protection. In accordance with a further development of the invention (FIGS. 8-11), the inner layer 20 of the rear wall 5 is also configured as a second diffuser wall and, to this aim, it has a perforation for the passage of the gas mixture from the cooling interspace 16 to an inner side of the inner layer 20, where the combustion occurs.

This increases the overall burning surface and consequently decreases the specific load (expressed in Watts per cm² of burning surface), for a given thermal power of the burner. In this manner, the combustion point shifts more toward radiant regimes, also for higher powers, involving a more efficient thermal exchange. Furthermore, by using the inner layer of the rear wall to obtain a second combustion surface, the flame, and the irradiation hit the heat exchanger not only laterally, but also from the rear side at the curved inversion zones of the tubes. This allows to obtain a more uniform thermal exchange and distributing it over a larger surface of the heat exchanger, further increasing the efficiency.

Figure 1:
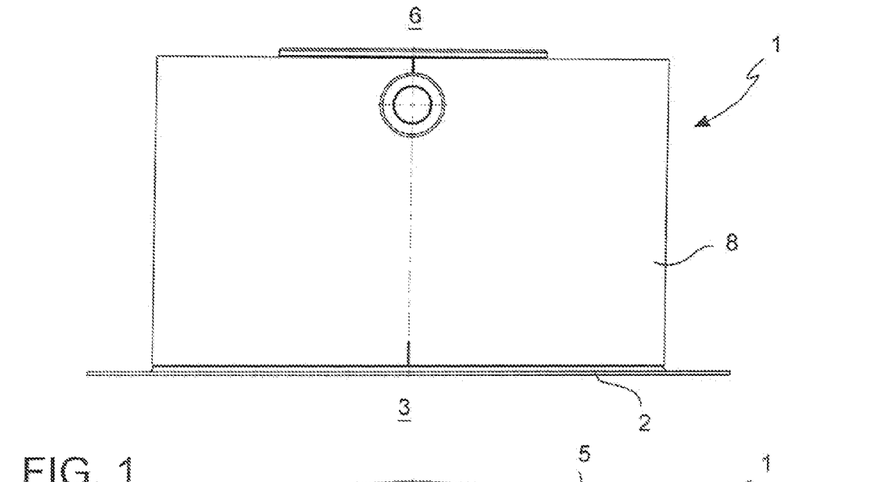
FIG. 1 is a side view of a burner according to an embodiment.
Figure 2:
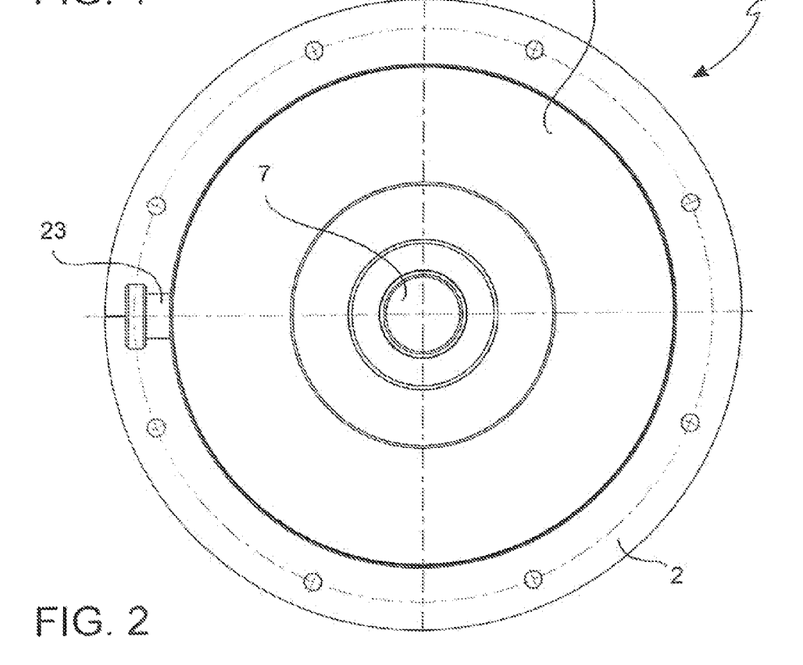
FIG. 2 is a top view of the burner in FIG. 1.
Figure 3:
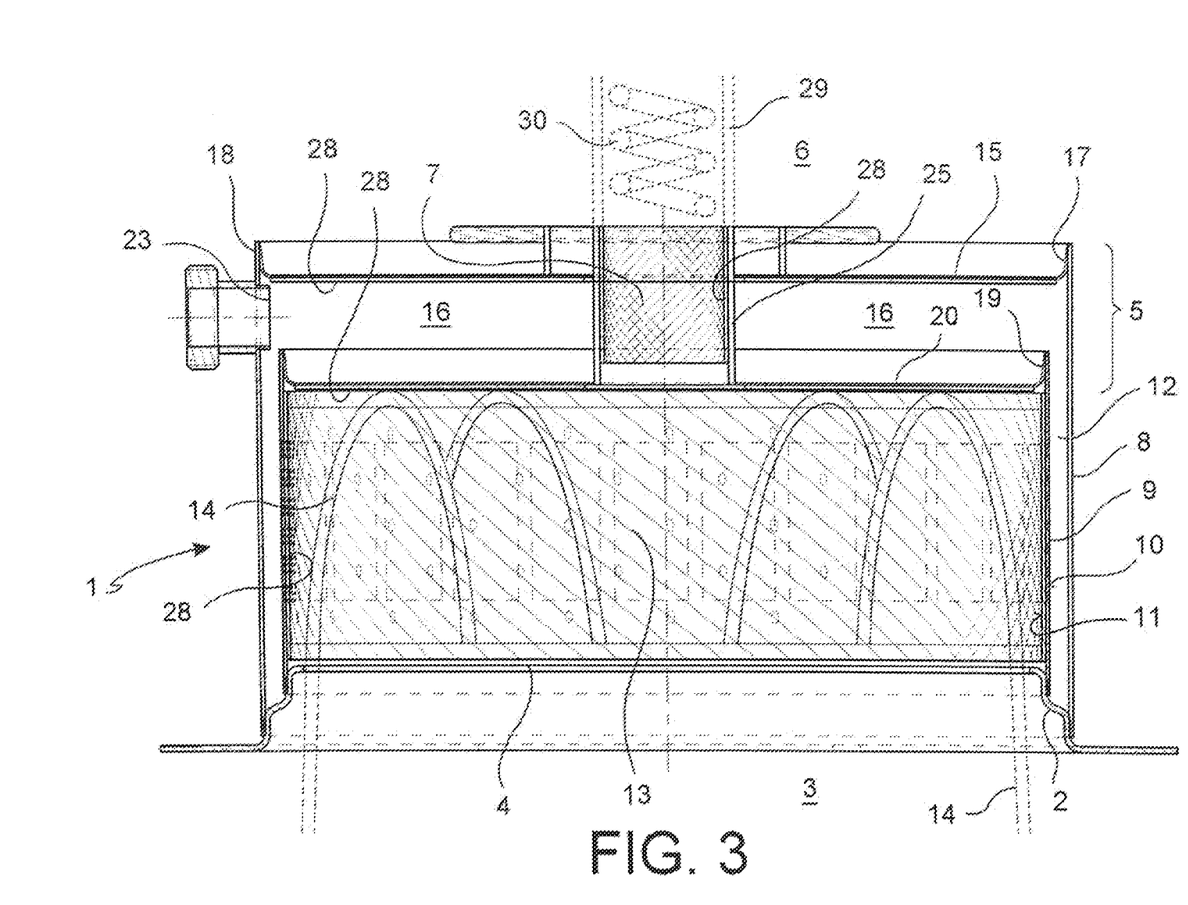
FIG. 3 is a longitudinal sectional view of the burner of FIG. 1.
Figure 4:
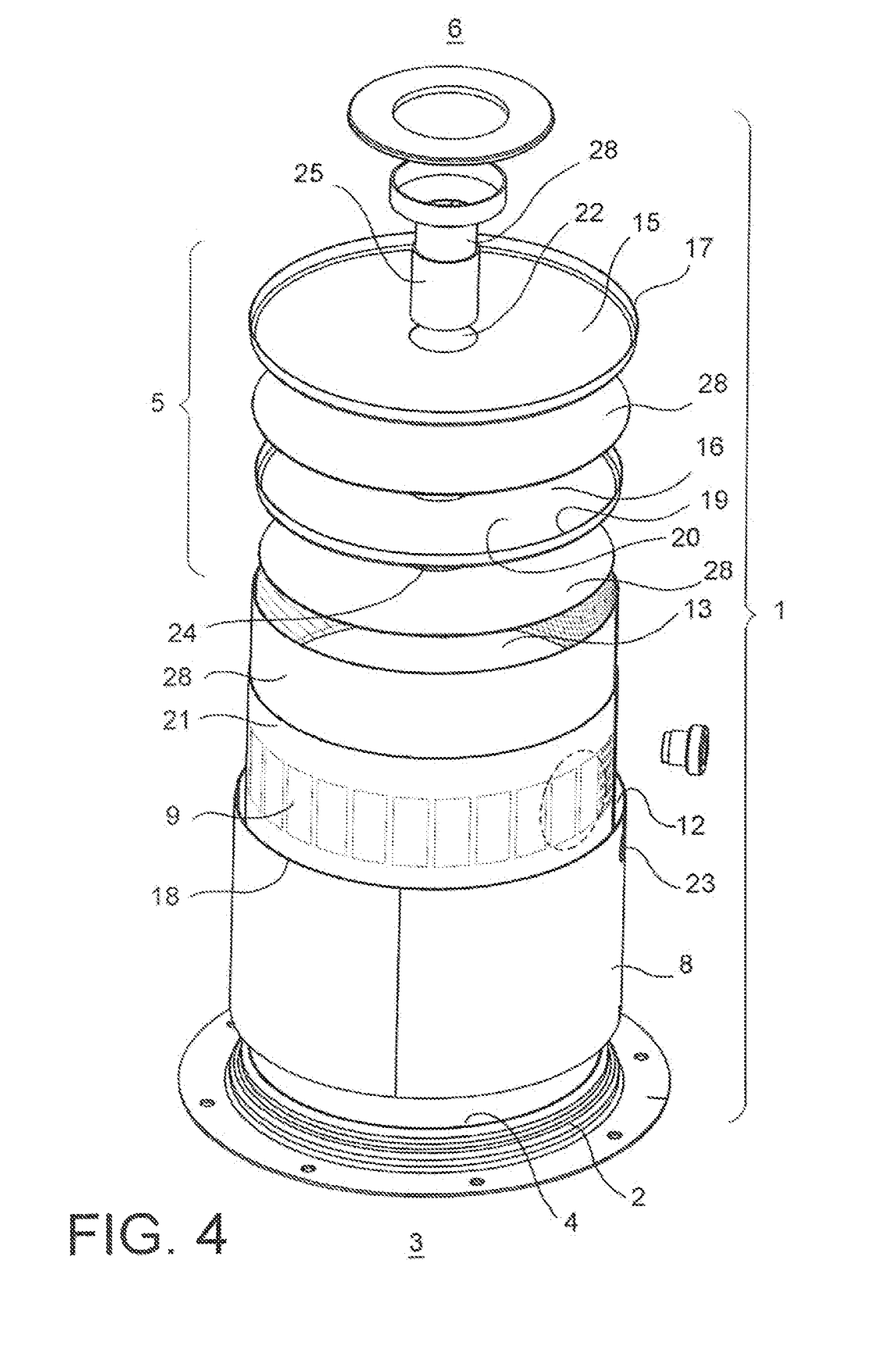
FIG. 4 is an exploded perspective view of the burner in FIG. 1.
Figure 5:
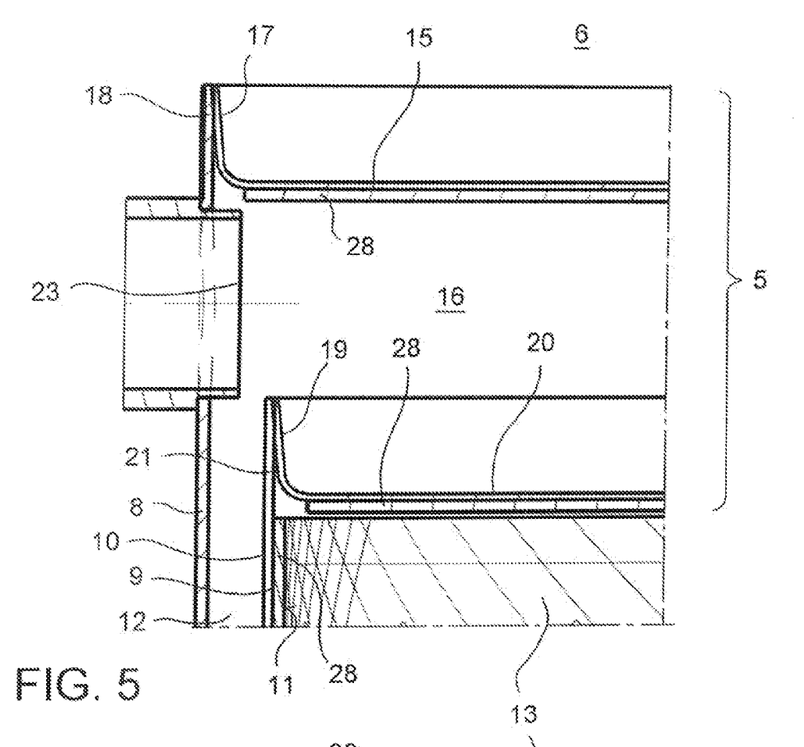
FIGS. 5, 6, and 7 illustrate some enlarged details of the burner according to embodiments.
Figure 6:
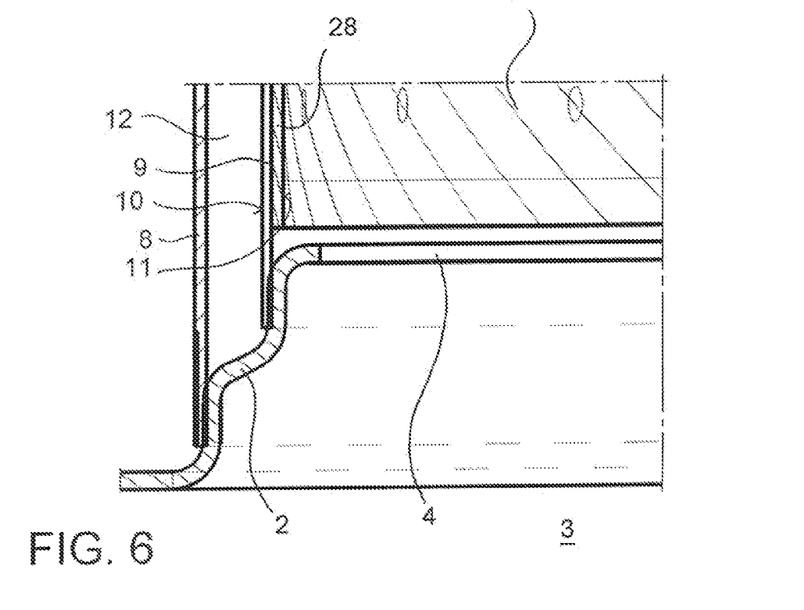
Figure 7:
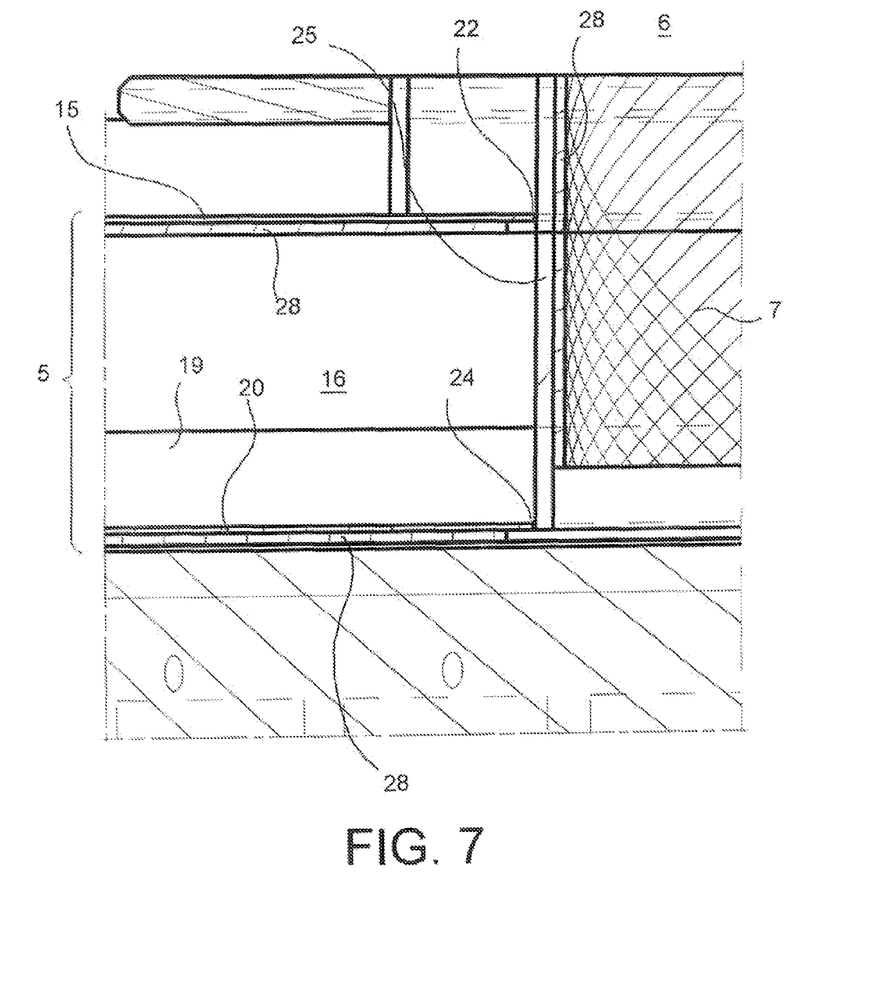
Figure 8:
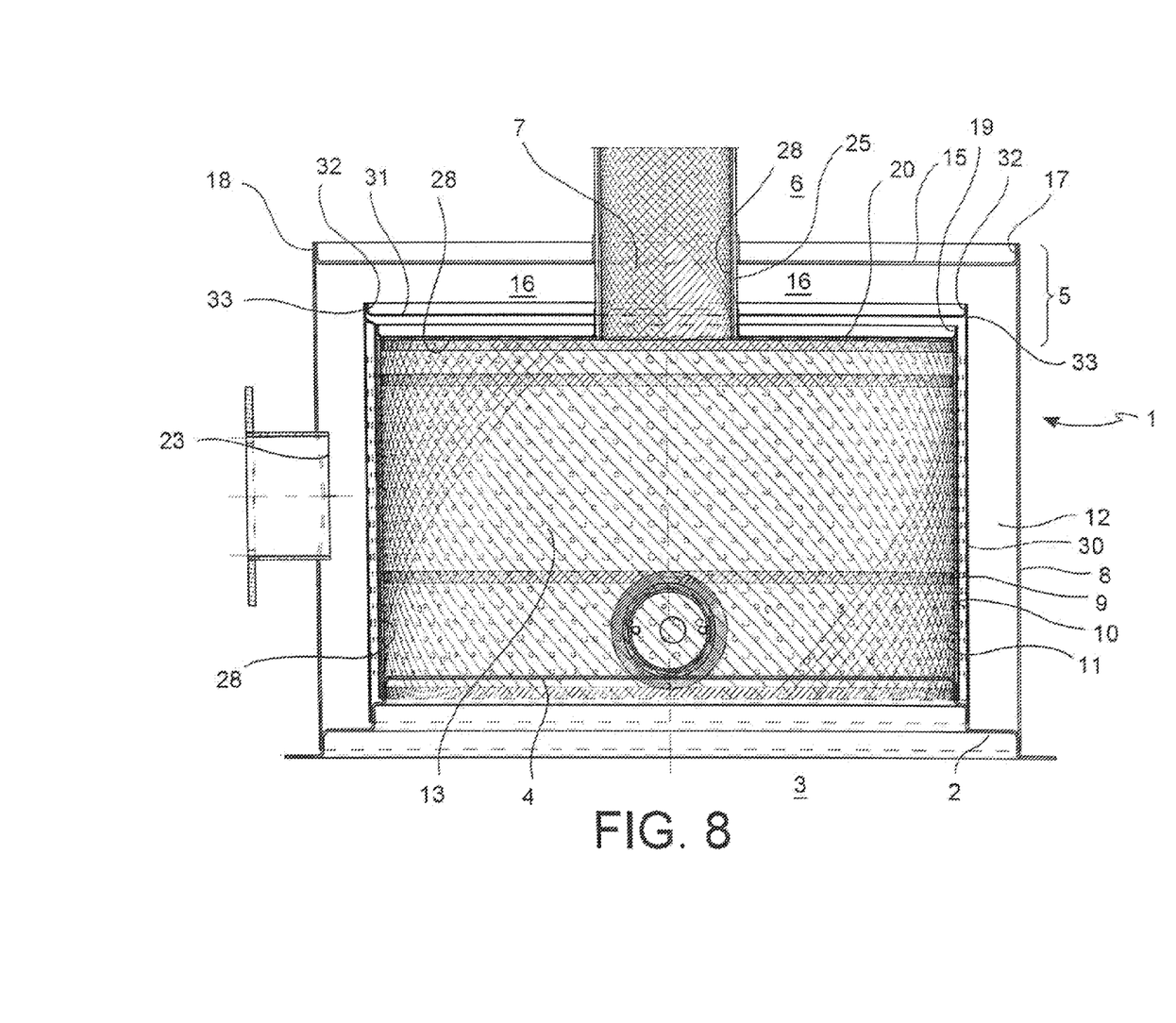
FIG. 8 is a longitudinal sectional view of the burner according to a further embodiment.
Figure 9:
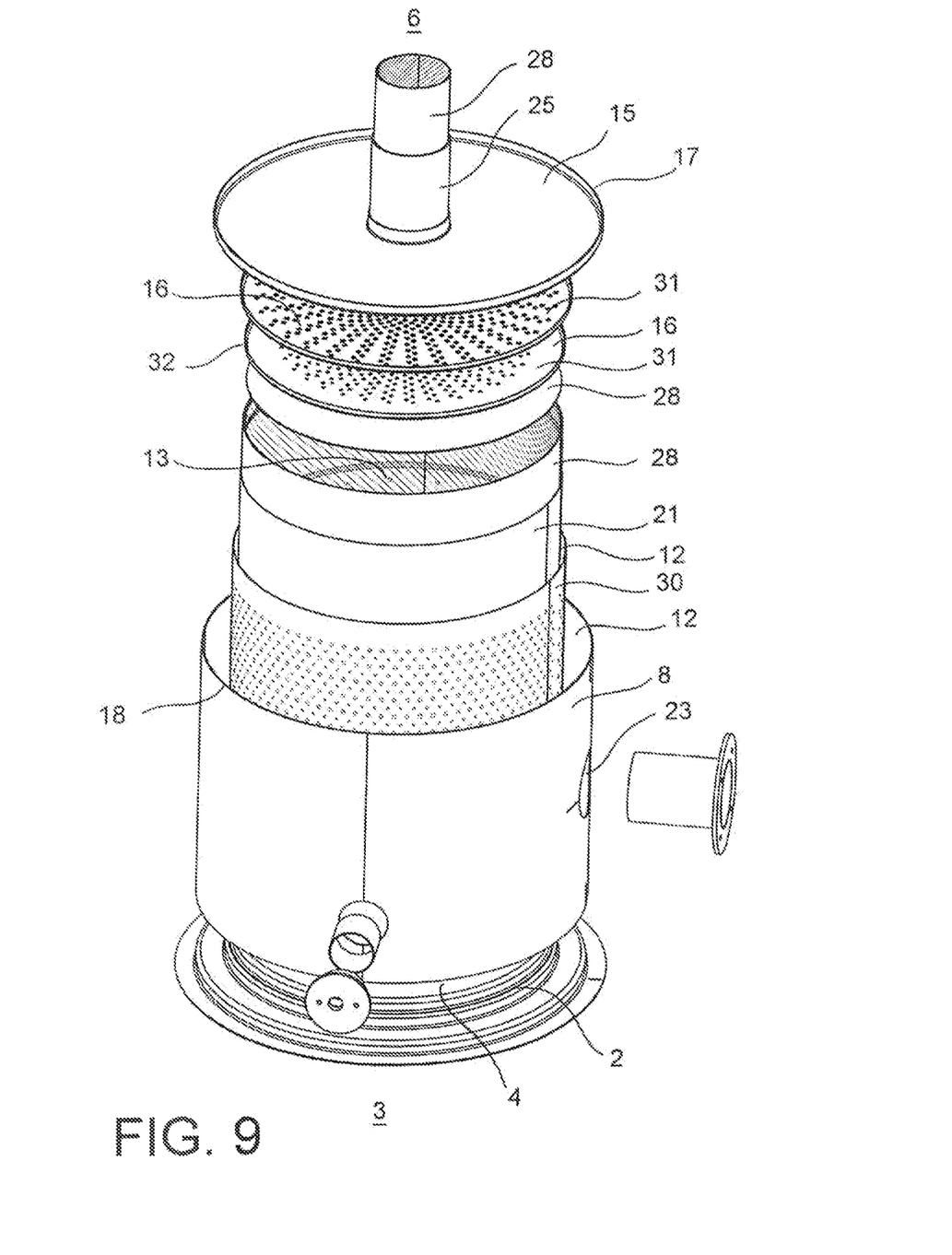
FIG. 9 is an exploded perspective view of the burner in FIG. 8.
Figure 10:
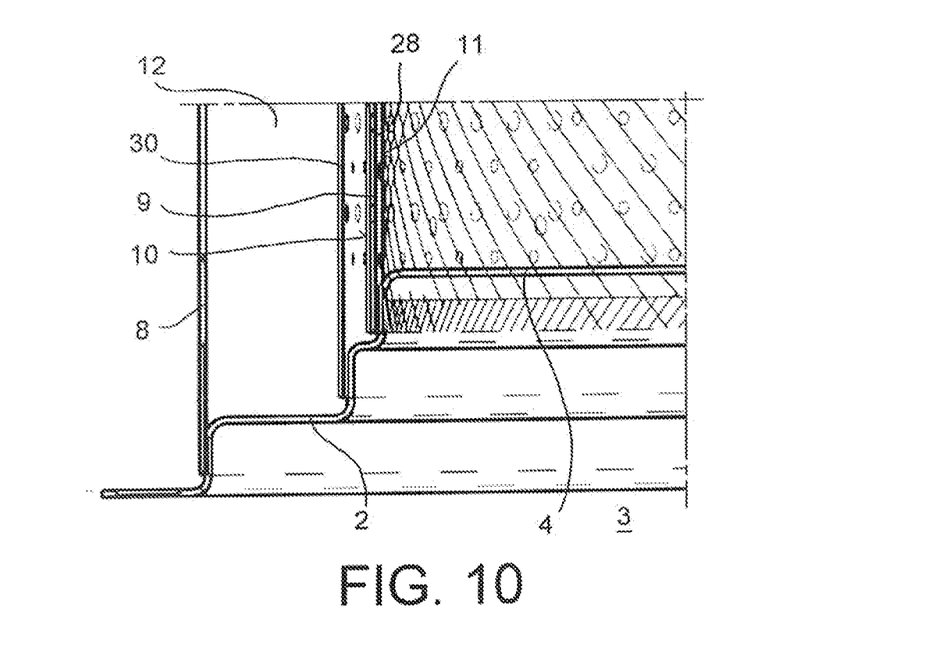
FIGS. 10 and 11 illustrate enlarged details according to embodiments of the burner in FIG. 8.
Figure 11:
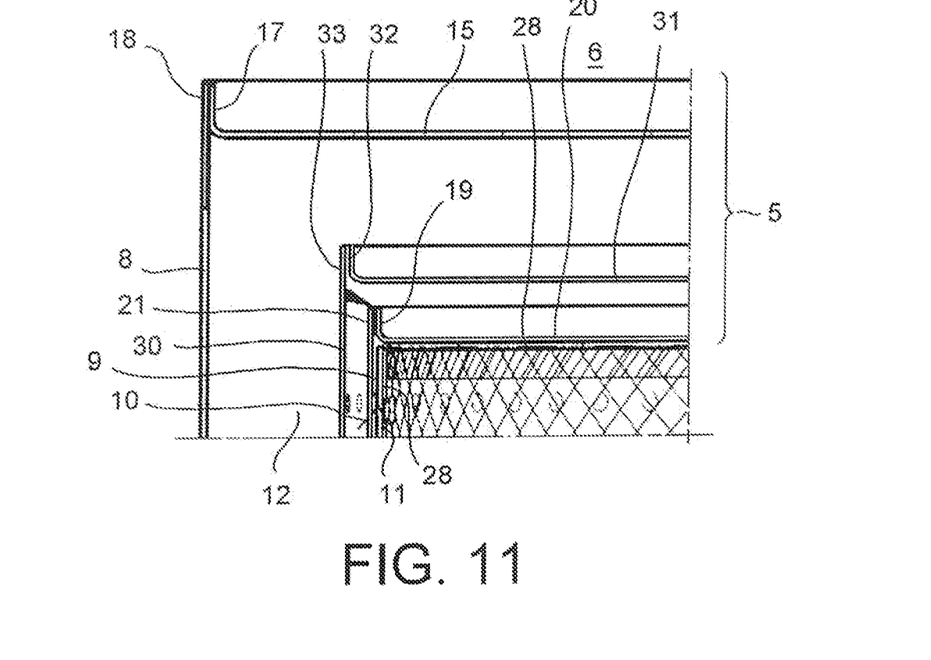

Similarly to the diffuser wall 9, the perforated steel sheet of the inner layer of the rear wall 5 is preferably internally lined by a mesh or fabric layer 28 in a metal material, e.g., FeCr alloy, or ceramic or sintered material, that forms the inner surface 11 of the second diffuser wall on which the combustion occurs, and furthermore it performs an insulating function, which further increases the thermal resistance of the burner 1. The mesh or fabric layer 28 in FIGS. 8-11 can be completely identical to the mesh or fabric layer 28 in the FIGS. 3 and 5, and it also performs the same thermo-insulating and mechanical protection functions described with reference to the first embodiment.

In a further embodiment (FIGS. 8-11), the burner 1 can comprise a first distribution wall 30, preferably made of a perforated steel sheet, in a tubular shape, e.g., cylindrical or frusto-conical, arranged in the annular distribution chamber 12 between the tubular diffuser wall 9 and the side wall 8 to obtain a more efficient distribution of the flow of the gas mixture on the outer side 10 of the diffuser wall 9, hence a better flame uniformity.

Similarly, and to the same aim, the burner 1 may comprise a perforated second distribution wall 31, arranged in the cooling interspace 16 between the outer layer 15 and the inner layer 20 of the rear wall 5 to obtain a more efficient distribution of the flow of the gas mixture on the outer side of the inner layer 20.

The first and second distribution walls 30, 31 together form a cup-shaped distributor inserted in the distribution cavity and completely surrounding the diffusion walls 9, 20.

The so-shaped distributor, beside to uniform the flame in the combustion chamber, decreases the thermal back-irradiation toward the exterior, with a consequent increase of the energy efficiency and less overheating of the outer walls of the burner 1.

Similarly to the side 8 and diffuser 9 walls, the first distribution wall 30 can be connected to the front 2 and/or rear 5 walls by pressfit and/or welding.

Similarly to the inner layer 20 of the rear wall 5, the second distribution wall 31 can be formed in a perforated metal sheet, particularly in steel, and it can be in the shape of a substantially planar or, alternatively, convex circular disc, the outer peripheral edges 32 of which can be bent in the direction of the rear side 6 (or the front side 3) in order to define a seat for the insertion of the a rear edge 33 of the first distribution wall 30 with certainty of a mutual positioning. Advantageously, the side wall 8, the diffuser wall 9 and the first distribution wall 30 are cylindrical and coaxial.

The invention is not limited to the burner 1 hereto described, but it also refers to a thermo-dynamic fluid heating unit, comprising the burner 1 and the first heat exchanger 14 having one or more fluid ducts extending through the opening of passage 4 in the combustion chamber 13 and, possibly, a second heat exchanger 30 arranged on the rear side 6 of the burner 1 and having one or more fluid ducts in a thermal exchange relationship with a fume discharge duct 29 connected to the fume discharge opening 7 of the rear wall 5.

The invention further relates to the use of the burner 1 and the thermo-dynamic fluid heating unit as a heat source for an external combustion engine, particularly for a Stirling engine.

It shall be apparent that, to the gas burner according to the present invention, those skilled in the art, with the aim of meeting contingent, specific needs, will be able to make further modifications and variants, all of which anyhow falling in the protection scope of the invention as defined by the following claims.

The invention claimed is:

1. A gas burner, comprising:
    a front wall defining a front side of the burner and forming an exchanger opening for the passage of a first heat exchanger,
    a rear wall defining a rear side of the burner and forming a discharge opening for discharging combustion fumes,
    a tubular side wall extending between the front wall and the rear wall,
    a tubular diffuser wall arranged within the side wall and extending between the front wall and the rear wall, said diffuser wall having a perforation for the passage of a gas mixture from an outer side of the diffuser wall to an inner side of the diffuser wall, where the combustion occurs,
    an annular distribution chamber formed between the side wall and the diffuser wall for the distribution of the gas mixture on the outer side of the diffuser wall,
    a combustion chamber formed within the tubular diffuser wall, said combustion chamber being defined on the rear side by the rear wall and suitable for the insertion of the first heat exchanger from the front side through the exchanger opening of the front wall,
    a cooling interspace formed within the rear wall and in flow communication with a gas inlet opening and with the distribution chamber so that a flow of the gas mixture is able to cool the rear wall,
        wherein the diffuser wall is internally lined with a mesh or fabric layer forming an inner combustion surface of the diffuser wall,
        wherein a surface of the rear wall facing the combustion chamber and defining the discharge opening is at least partially lined with a thermal-resistant mesh or fabric.

2. The gas burner according to claim 1, wherein the rear wall comprises an outer layer having a peripheral edge connected with a rear edge of the side wall, and an inner layer arranged between the outer layer and the combustion chamber and having a peripheral edge connected with a rear edge of the diffuser wall, wherein the cooling interspace is formed between the outer and inner layers, and it forms, together with the annular distribution chamber, a cup-shaped distribution cavity.

3. The gas burner according to claim 1, wherein the gas inlet opening opens into the cooling interspace externally to the annular distribution chamber, so that the gas flow enters first in the cooling interspace and then in the annular distribution chamber.

4. The gas burner according to claim 2, wherein the gas inlet opening is formed in the side wall in a zone between the outer layer and the inner layer of the rear wall.

5. The gas burner according to claim 2, wherein the outer layer and the inner layer are formed in a metal sheet in the shape of a circular disc with the peripheral edge bent in the direction of the rear side so as to define a seat for a mutual insertion with the respective rear edges of the side and the diffuser walls.

6. The gas burner according to claim 1, wherein the inner layer of the rear wall implements a second diffuser wall and has a perforation for the passage of the gas mixture from the cooling interspace to an inner side of the inner layer, where the combustion occurs.

7. The gas burner according to claim 2, wherein the inner layer of the rear wall is internally lined by a mesh or fabric layer forming an inner surface of the second diffusion wall.

8. The gas burner according to claim 1, comprising a tubular shaped first distribution wall in perforated sheet, arranged in the annular distribution chamber between the tubular diffuser wall and the side wall.

9. The gas burner according to claim 8, comprising a second distribution wall in perforated sheet, arranged in the cooling interspace between the outer layer and the inner layer of the rear wall.

10. The gas burner according to claim 9, wherein the first and second distribution walls together form a cup-shaped distributor completely surrounding the diffusion walls.

11. A thermo-dynamic fluid heating unit in an external combustion engine, said heating unit comprising the burner according to claim 1, as well as said first heat exchanger having one or more fluid ducts extending through the exchanger opening in the combustion chamber.

12. The heating unit according to claim 11, comprising a second heat exchanger arranged on the rear side of the burner and having one or more fluid ducts in a thermal exchange relationship with a fume discharge duct connected to the fume discharge opening of the rear wall of the burner.

13. Use of the heating unit according to claim 11, as a heat source for an external combustion engine, particularly for a Stirling engine.

* * * * *